United States Patent
Shevtsov et al.

(10) Patent No.: US 12,154,091 B2
(45) Date of Patent: *Nov. 26, 2024

(54) COMPUTER VISION GROUPING RECOGNITION SYSTEM

(71) Applicant: Toshiba Global Commerce Solutions Holdings Corporation, Tokyo (JP)

(72) Inventors: Evgeny Shevtsov, Frisco, TX (US); Charles Ray Kirk, Raleigh, NC (US); J. Wacho Slaughter, Raleigh, NC (US); Andrei Khaitas, McKinney, TX (US); Srija Ganguly, Raleigh, NC (US); Yevgeni Tsirulnik, Frisco, TX (US)

(73) Assignee: Toshiba Global Commerce Solutions Holdings Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/336,606

(22) Filed: Jun. 16, 2023

(65) Prior Publication Data

US 2023/0342747 A1  Oct. 26, 2023

Related U.S. Application Data

(63) Continuation of application No. 17/490,565, filed on Sep. 30, 2021, now Pat. No. 11,681,997.

(51) Int. Cl.
*G06Q 20/20* (2012.01)
*G06F 18/214* (2023.01)

(52) U.S. Cl.
CPC ......... *G06Q 20/209* (2013.01); *G06F 18/214* (2023.01); *G06Q 20/203* (2013.01); *G06Q 20/206* (2013.01)

(58) Field of Classification Search
CPC .................................................... G06F 18/214
See application file for complete search history.

(56) References Cited

U.S. PATENT DOCUMENTS 5,546,475 A * 8/1996 Bolle ................... G06V 10/507
382/110
6,431,446 B1 * 8/2002 Gu ........................ G06V 20/68
235/455

(Continued)

OTHER PUBLICATIONS

Kagaya, Hokuto, Kiyoharu Aizawa, and Makoto Ogawa. "Food detection and recognition using convolutional neural network." Proceedings of the 22nd ACM international conference on Multimedia. (Year: 2014).*

(Continued)

*Primary Examiner* — Nathan A Mitchell
(74) *Attorney, Agent, or Firm* — Patterson + Sheridan, LLP

(57) ABSTRACT

Computer vision grouping recognition is provided by receiving training images that include unpackaged items; identifying, by a computer vision model, a candidate identities for unpackaged items in a given training image; receiving, from a human user, a selected identity for the unpackaged item as feedback for the candidate identity; constructing a confusion matrix tallying matches and mismatches between candidate identities and the selected identities as analyzed across the training images for each unpackaged item; identifying at least one product category that includes at least a first unpackaged item and a second unpackaged item that the confusion matrix indicates as being misidentified for each other by the computer vision model; and reconfiguring the computer vision model to identify the product category instead of the first unpackaged item or the second unpack- (Continued)

aged item when analyzing a given image including one or more of the first unpackaged item or the second unpackaged item.

20 Claims, 9 Drawing Sheets

(56) References Cited

U.S. PATENT DOCUMENTS

| | | | | |
|---|---|---|---|---|
| 6,471,125 | B1* | 10/2002 | Addy | G07G 3/003 |
| | | | | 235/462.14 |
| 7,845,554 | B2* | 12/2010 | Jacobs | G06Q 20/20 |
| | | | | 235/383 |
| 9,412,050 | B2* | 8/2016 | He | G06F 18/253 |
| 9,412,099 | B1* | 8/2016 | Tyree | A47F 9/04 |
| 10,061,490 | B2* | 8/2018 | Tsunoda | H04N 23/63 |
| 10,650,368 | B2* | 5/2020 | Kwan | G06K 7/10831 |
| 11,481,751 | B1* | 10/2022 | Chaubard | G06V 10/82 |
| 2002/0194074 | A1* | 12/2002 | Jacobs | G07G 1/145 |
| | | | | 705/16 |
| 2010/0158310 | A1* | 6/2010 | McQueen | A47F 9/046 |
| | | | | 348/E5.022 |
| 2010/0217678 | A1* | 8/2010 | Goncalves | G07G 1/0063 |
| | | | | 382/209 |
| 2011/0286628 | A1* | 11/2011 | Goncalves | G06F 16/5838 |
| | | | | 382/218 |
| 2013/0001295 | A1* | 1/2013 | Goncalves | G07G 1/0072 |
| | | | | 235/375 |
| 2013/0236053 | A1* | 9/2013 | Naito | G06V 10/255 |
| | | | | 382/103 |
| 2014/0023241 | A1* | 1/2014 | Sugasawa | G06F 18/28 |
| | | | | 382/110 |
| 2014/0153786 | A1* | 6/2014 | Takeno | G06V 10/987 |
| | | | | 382/110 |
| 2015/0194025 | A1* | 7/2015 | Tsunoda | G06T 7/73 |
| | | | | 348/150 |
| 2015/0278224 | A1* | 10/2015 | Jaber | G06F 16/583 |
| | | | | 707/758 |
| 2017/0083892 | A1* | 3/2017 | Taira | G06Q 20/208 |
| 2017/0206517 | A1* | 7/2017 | Kwan | G06K 7/1473 |
| 2019/0188435 | A1* | 6/2019 | Davis | G06V 10/10 |
| 2019/0220692 | A1* | 7/2019 | Wu | G06F 18/00 |
| 2020/0293840 | A1* | 9/2020 | Kang | G06F 18/23 |
| 2021/0117948 | A1* | 4/2021 | Voss | G06F 18/40 |
| 2022/0067568 | A1* | 3/2022 | Hemmatiyan | G06V 10/7747 |
| 2022/0343635 | A1* | 10/2022 | Shinzaki | G06Q 20/208 |
| 2023/0005342 | A1* | 1/2023 | Brakob | G07G 1/0045 |

OTHER PUBLICATIONS

Bukhari, Syed Talha, et al. "Arc: A vision-based automatic retail checkout system." arXiv preprint arXiv:2104.02832 (2021). (Year: 2021).*

* cited by examiner

310

| Presented \ Recognized As | Red Apple | Green Apple | Green Pear | Yellow Pear | Seville Orange | Navel Orange | Lemon |
|---|---|---|---|---|---|---|---|
| Red Apple | 70 | 30 | | | | | |
| Green Apple | 35 | 60 | 5 | | | | |
| Green Pear | | 20 | 70 | | | | |
| Yellow Pear | | | 20 | 80 | | | |
| Seville Orange | | | | | 55 | 45 | |
| Navel Orange | | | | | 45 | 45 | 10 |
| Lemon | | | | | | 5 | 94 |

FIG. 3A

COMPUTER VISION GROUPING RECOGNITION SYSTEM

CROSS-REFERENCE TO RELATED APPLICATIONS

This application is a continuation of U.S. patent application Ser. No. 17/490,565, filed Sep. 30, 2021, which is herein incorporated by reference in its entirety for all purposes.

BACKGROUND

The present disclosure relates to improvements in the development and deployment of computer vision models for use in identifying unpackaged items such as produce items. Although Radio Frequency Identification (RFID) tags, barcodes, and other identifiers (e.g., produce tags) may aid in the identification of items for inventory management and check-out, not all items can be readily or effectively identified by individualized identifiers. For example, a can of beans or a pre-packaged bag of beans may include a barcode or RFID tag, but individual beans (e.g., selected in bulk from a produce section) do not have such identifiers, as individually labeling the beans is unfeasible and inconvenient to the supplier and the end user. Similarly, various produce items include stickers that indicate associated shop keeping units (SKUs) or price look-up (PLU) codes for those items, but not every item may be labeled, and labels occasionally detach or fall off of previously labeled items during normal handling (and through malicious relabeling).

BRIEF DESCRIPTION OF THE DRAWINGS

FIGS. 3A-3C illustrate item classification and distinguishing schemes, according to embodiments of the present disclosure.

DETAILED DESCRIPTION

Figure 1A:
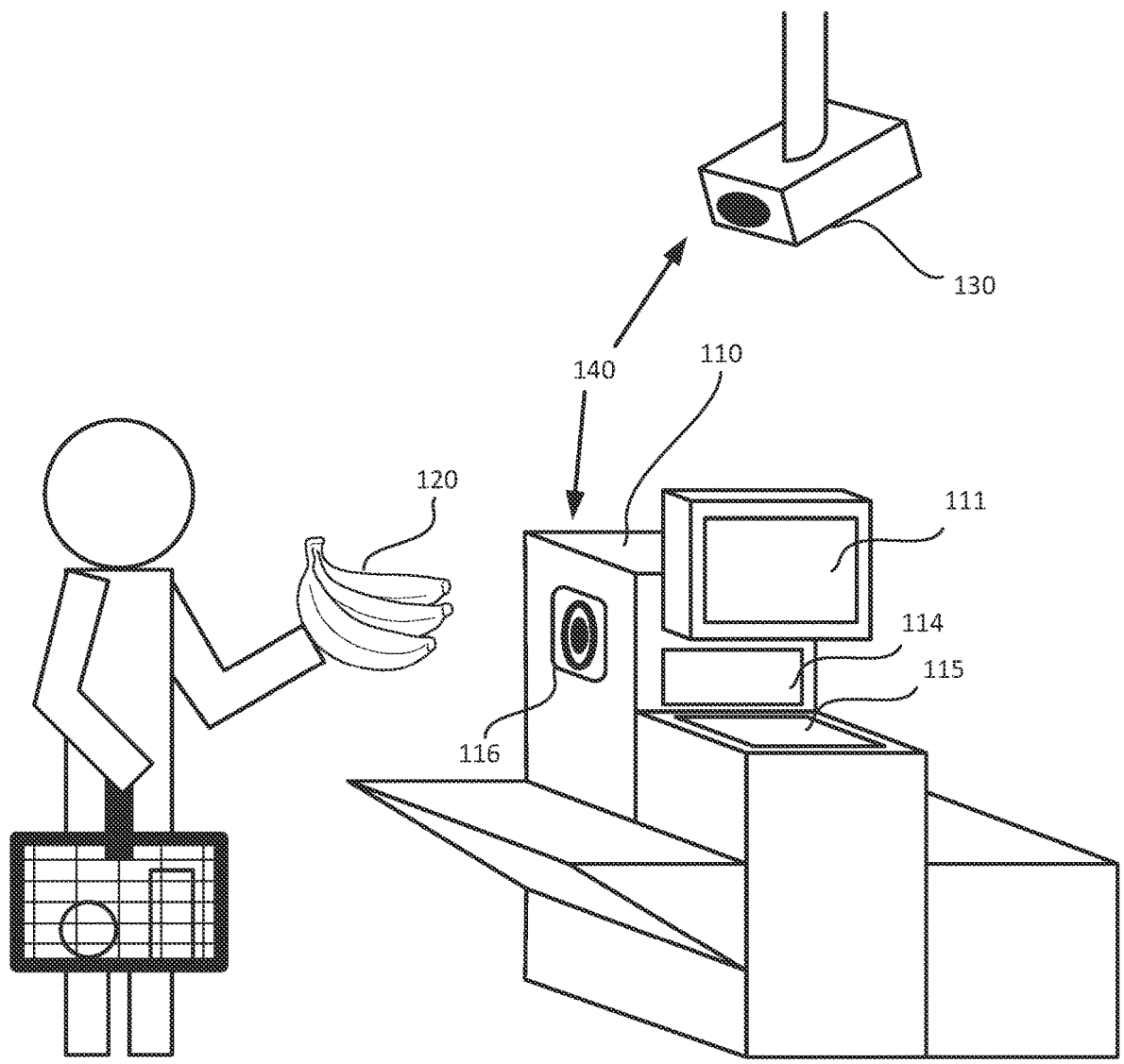
FIGS. 1A and 1B illustrate example environments for the use of computer vision grouping recognition, according to embodiments of the present disclosure.

Accordingly, computer vision models have been used to help identify unpackaged items where other identification schemes are impossible or otherwise unreliable. However, given the breadth of the unpackaged items that these models are tasked with distinguishing between, the natural variation inherent to these unpackaged items (like produce), and disparate views, lighting conditions, and hardware available to the computer vision models, identification of unpackaged items remains challenging.

The present disclosure provides for improvements in the development and deployment of computer vision models for use in identifying unpackaged items. To aid in unpackaged item identification, the computer vision model is trained to replace individual item classifications with a category identifier, and thereby avoid assigning an individual item identity when the confidence in the individual identity determination is below a given confidence threshold. In various embodiments, the computer vision model may offload the final determination to a human user or avoid a determination entirely when system parameters dictate. For example, a loss prevention system may use a computer vision model to ensure that an item scanned (accidentally or maliciously) at a self-checkout kiosk as a banana is not, in fact, a steak, but may not activate loss prevention measures to make a determination between organic or regular bananas despite the two items having different Shop Keeping Units (SKUs) for inventory tracking purposes.

A computer vision model operates differently for item identification than typical human vision. Various still images, which may be extracted from a video feed, provide the computer vision model with primary input, which may be supplemented with positional sensor data (e.g., to indicate how close to a given camera the object is), weight sensor data, supplemental camera data (e.g., from multiple cameras at different angles or taken at different times), product catalogs, and label reader data (e.g., reading a barcode). Accordingly, computer vision models may offer better item-to-item distinguishing in some cases than a human, and offer worse item-to-item distinguishing in other cases, often with unexpected results. For example, a human user may not be able to distinguish green pears of a first cultivar from green pears of a second cultivar, while a computer vision model may make accurate determinations between the two pear types with a high level of accuracy due to sensors and data either unavailable to the human user or beyond the range of human senses (e.g., infrared or ultraviolet vision). In contrast, few human users would confuse a pineapple with a carrot, but the presence of leaves on a particularly large carrot may confuse some computer vision models with the leaves on a pineapple. Accordingly, knowing when and how to leverage the two different identification pathways offered by humans and computer vision models can improve the overall accuracy of item identification, while improving the overall user experience.

In some examples, the computer vision model is therefore trained during an enrollment period, and continually or periodically updated during operations, to identify various unpackaged items that the computer vision model confuses with one another. Over time, the computer vision model develops a confusion matrix of the items that have a confidence level within a confusion range for distinguishing between, which the computer vision model uses to describe and develop a product category. In one embodiment, the product category is created from a confusion matrix that tracks the peculiarities of the computer vision model, rather than a human-based assumption of how items are to be identified (or potentially confused). Continuing the example of the carrot confused for a pineapple above, a product category created from the confusion matrix for the given computer vision model would include each item for cross-identification, whereas a human user who was not confused would not group these items together. This product category then replaces the individual items within that category for purposes of computer vision identification Using product categories based on the confusion matrix, the computer vision model is provided with fewer candidates to distinguish between and can distinguish between those candidates with greater accuracy. Accordingly, the improved computer vision system of the present disclosure may produce results faster than previous computer vision systems (e.g., using less power and fewer processor cycles or other computing resources). The computer vision system may offload a final determination to a human (such as a customer or associate in a grocery environment) to apply a different analysis framework to identifying the individual item from within the category.

The hybrid identification system provided by the computer vision model of the present disclosure may be executed in the background or the foreground at various stages of the checkout process to aid in the user experience. For example, when the computer vision model identifies a category with a single item therein, the computer vision model may proceed with checkout without prompting a user for further input. In one example, when the computer vision model identifies a category with multiple items therein, the computer vision model may present a prompt to the user to identify which of the constituent items is present. For example, category X may include various citrus fruit that the computer vision system has trouble distinguishing between, and the user is prompted to identify whether citrus of type A, type B, or type C is being presented for purchase. The computer vision model may then use the external data available to the user (e.g., remembering which display stand the item was selected from) and different analysis framework of the user to finalize identification of the product.

In another example, the computer vision model may avoid presenting a prompt to the user even when the category contains multiple items that the computer vision model has trouble distinguishing between when the operator has prioritized throughput over inventory accuracy. For example, category Y may include black plums and red plums, which the computer vision model cannot readily distinguish between without user input. If both types of plum are priced similarly (e.g., within ±10% or another operator configurable amount) to each other, the operator may prefer speeding up the check-out process over any potential shrinkage or inventory discrepancies. The system therefore selects one of the individual items within the category for purchase without confirming the actual identity of the particular plum with the user at the time of purchase. In various embodiments, determining whether to avoid presenting the prompt may be selectively activated or deactivated based on price discrepancies, line length at check-out, number of items selected for checkout (e.g., automatic selection for one plum versus prompting for X plums), whether a loyalty program card has been presented, user history (e.g., user X buys black plums more often than red plums), or other factors and combinations thereof. Accordingly, the speed and ease of use of a separate computing system (e.g., a point of sale (POS) terminal) may be improved by the described improvements to the computer vision model.

In another example, a user who enters the identity of an unpackaged item that does not appear to fall within the item category may be prompted to confirm the identity of the item before proceeding. For example, an associate may accidentally enter the wrong SKU for an item, and the computer vision model acts as a confirmation check before the transaction continues, a loss prevention system is activated, or a customer complains about being charged for the wrong item. In another example, an associate may correctly enter an SKU for an unusual looking piece of produce, and on confirmation by the associate of the identity of the produce to the computer vision model, the computer vision model may update a training set to account for the unusual produce appearance in future instances or request maintenance of the image capturing devices or to the surrounding environment (e.g., to clean a camera lens, change nearby lighting, etc.). Accordingly, described embodiments of the computer vision model also provide improvements to other supporting systems as well as ongoing improvements to the computer vision model itself to adapt a generalized model to a local environment and the imaging conditions therein.

Although the examples presented herein are generally given in relation to produce (e.g., fruits and vegetables sold without containers), the present disclosure is contemplated for use across a wide range of unpackaged items. As used herein, a "unpackaged item" generally refers to an item with a non-standard or variable appearance that lacks a standardized non-intrinsic identifier (or the operator chooses not to use the non-intrinsic identifier), or lacks a standardized price with other items of the same identity. For example, a first steak and a second steak may each have different weights, shapes, marbling patterns, etc., and therefore may be priced differently despite sharing an item identity (e.g., choice ribeye), and are therefore classified as unpackaged items. In contrast, a first bell pepper contained in stay-fresh packaging including a barcode and a set price with all other bar-coded bell peppers may be considered "packaged", while a second bell pepper (whether sold by weight or by unit) that lacks the standardized packaging and non-intrinsic identifier (e.g., the barcode) of the first bell pepper is considered an unpackaged item. In a further example, a clamshell package of drywall screws may be considered packaged, while a self-packed bag of the same drywall screws selected in bulk may be considered unpackaged. In yet another example, a retailer selling individually wrapped candies (with barcodes on the individual wrappers) by weight rather than by unit, may ignore the barcodes and treat a bag full of the candies as one unpackaged item rather than several packaged items (e.g., a bag of X pounds of candy versus Y individual candies).

Accordingly, the determination of whether an item is unpackaged or packaged depends on what the underlying item in the system available for purchase is, and whether that item is standardized across several instances of the item. For example, a bag of green beans selected in bulk (with or without a barcode or other identifier) may be treated as one unpackaged item (rather than each bean being treated as a separate unpackaged item) as the "item" available for purchase is handled in bulk. In contrast, a pre-packaged can of green beans (despite being a vegetable) is not considered an unpackaged item, as the can itself has a standardized appearance that is handled as a fungible item with other such cans, despite any differences in appearances (e.g., dents, rebranding of labels, etc.) between individual cans or the contents thereof.

In some examples, an item may be defined as an unpackaged item when two or more of the following are true: the item has a variable appearance from other unpackaged items sharing a given identity (e.g., a first banana does not look like a second banana); the item has a variable price from other unpackaged items sharing the given identity (e.g., a first pineapple may cost less than a second pineapple); and the item is distinguishable from different items based on intrinsic features or excludes of otherwise does not include an non-intrinsic identifying feature (e.g., a first apple may include or exclude a sticker with a Price Look-Up (PLU) code for that type of apple, but is distinguishable from a second apple based on color, shape size, etc. of the different apples). The computer vision model is trained to differentiate between different unpackaged items (e.g., between fruits and vegetables) based on various intrinsic features, such as color, shape, size, texture or pattern, density, and combinations thereof, to identify different instances of a given unpackaged item (e.g., a first apple and a second apple) and unpackaged items having different identities (e.g., an apple of a first variety and an apple of a second variety).

Additionally, although examples presented herein are generally given in relation to the purchasing of unpackaged items, the present disclosure is contemplated for use across a wide range of shop keeping and inventorying activities. For example, confirming that a given amount of a correct item is removed from an internal warehouse inventory list, marking or identifying proper locations for the display or grouping with items of the same identity, aiding in spoilage tracking so that a given amount of the correct product is removed from inventory when spoiled or damaged, etc.

Figure 1B:
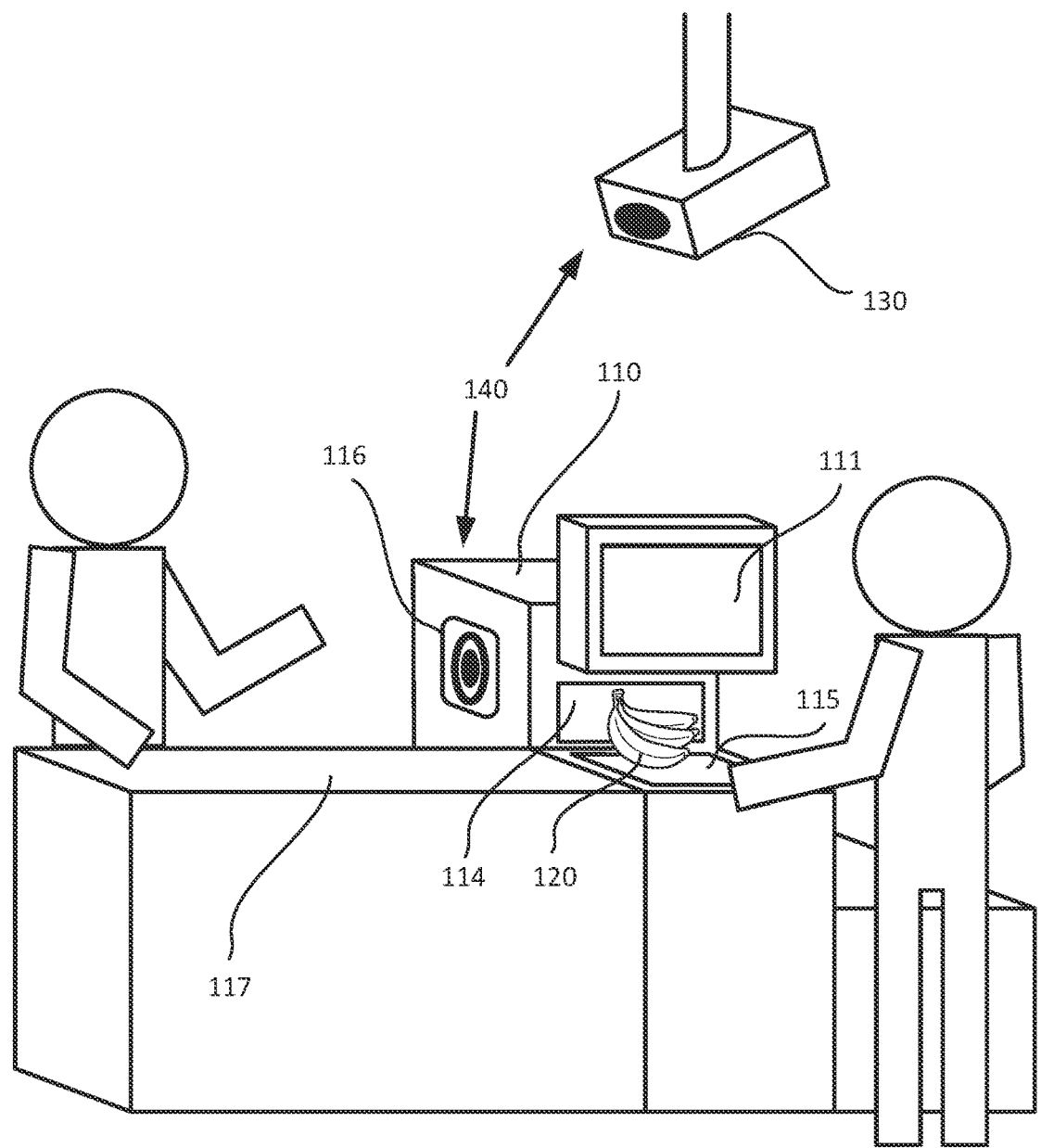

FIGS. 1A and 1B illustrate example environments for the use of computer vision grouping recognition, according to embodiments of the present disclosure.

FIG. 1A illustrates a self-checkout style kiosk 110 that a user is interacting with as a point of sale (POS) terminal to purchase an unpackaged item 120 (illustrated as a bunch of bananas). The kiosk 110 includes a control panel 111, which provides a GUI that a user can interact with to access various functionalities of the kiosk 110. FIG. 1B illustrates an associate-operated style kiosk that an associated uses on behalf of a customer as a POS terminal to provide an unpackaged item 120 (illustrated as a bunch of bananas) for the user. Example hardware for a computing device for use in the kiosk 110 is discussed in greater detail in regard to FIG. 6.

Functions of the kiosk 110 can include: identifying items to include or remove from a transaction, identifying weights/sizes of items in a transaction, performing loss prevention activities, moving items to different locations in the terminal (e.g., via a conveyor 117), ensuring that items identified in a transaction match those provided to a user (e.g., scanned items match bagged items), accepting payment, providing receipts, and the like. In various embodiments, the kiosk 10 includes a barcode reader 114 and a scale 115 to help identify items or characteristics of those items.

The kiosk 110 captures images of the various unpackaged items 120 provided in a check-out area by various integrated cameras 116, external cameras 130, and other sensors (including the scale 115, range finders, and the like) which may collectively be referred to as an imaging system 140 for the kiosk 110. The imaging system 140 may include various integrated cameras 116 that provide different views of the unpackaged item 120 for an individual kiosk 110. The imaging system 140 can also include one or more external cameras 130, which may be particular to a given kiosk 110 or shared among several kiosks 110 to optionally provide different viewing angles and image capturing capabilities to help identify the unpackaged items 120. In various embodiments, the imaging system 140 includes various motors to reposition the various cameras to focus in different areas, light sources (including flashes) to provide additional illumination for the unpackaged items 120, and range finders to aid in focusing or determining a distance to an unpackaged item 120. In various embodiments, the cameras included in the imaging system 140 are included in various computing devices, such as those described in relation to FIG. 6, and may include still cameras, video cameras, and combinations thereof.

Figure 2:
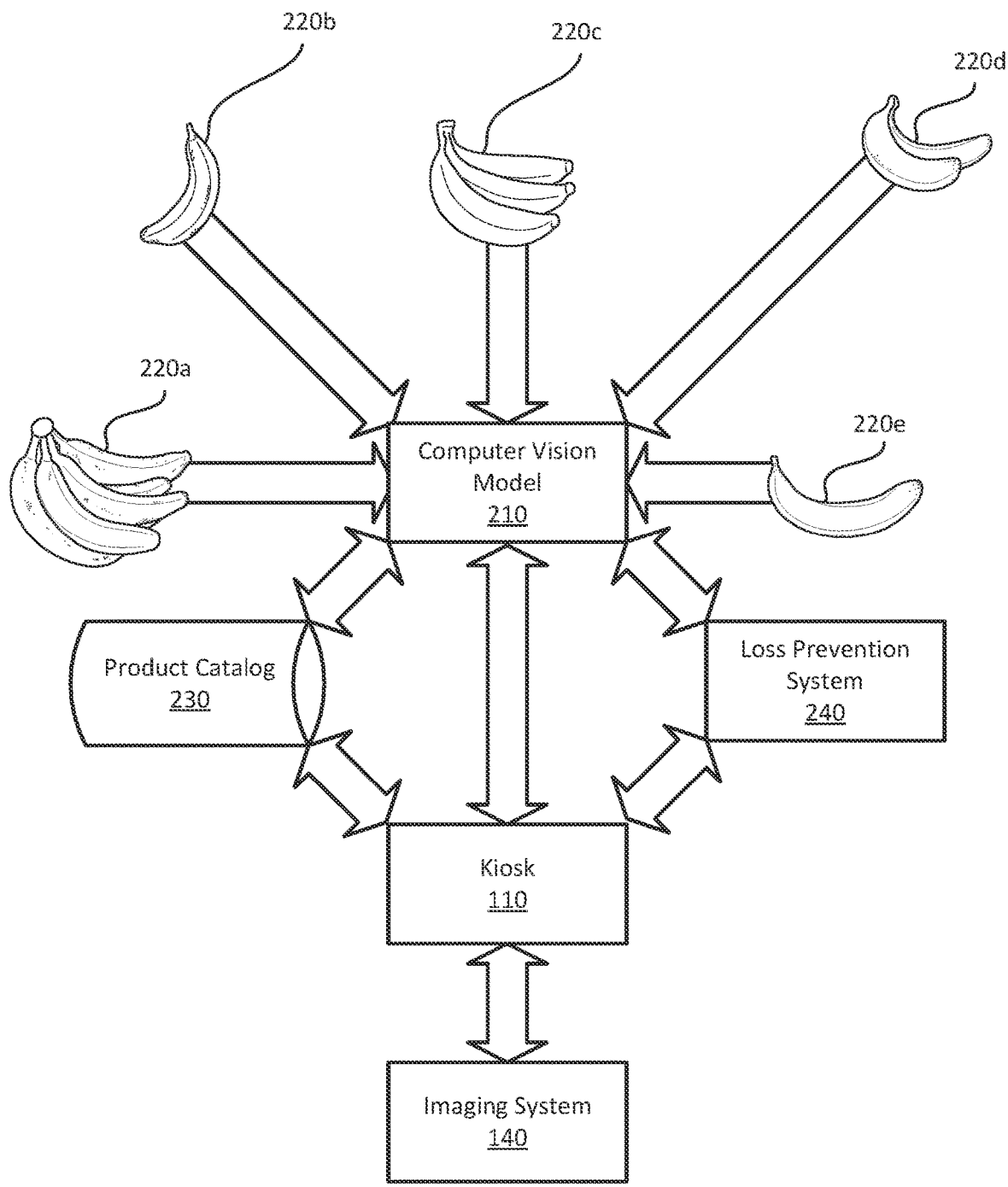
FIG. 2 illustrates an operational architecture for a computer vision model, according to embodiments of the present disclosure

FIG. 2 illustrates an operational architecture for a computer vision model 210, according to embodiments of the present disclosure. When analyzing images of unpackaged items 120, which may have various features that distinguish one instance of a class of unpackaged items 120 from other instances thereof, the computer vision model 210 is trained to recognize various images of the item in question to produce a "best guess" as to the underlying identity of the item. For example, computer vision model 210 is trained using various supervised learning data sets according to a machine learning scheme to receive various images 220a-e (generally or collectively, image 220) from the imaging system of various kiosks 110 to provide a consistent output. The computer vision model 210 may include various Machine Learning (ML) models such as Convolutional Neural Networks (CNNs), Deep Neural Networks (DNNs), k-means clustering, support vector machines, or any other type of ML algorithm or model suitable for computer vision.

As illustrated in FIG. 2, various images 220a-e of bananas are provided to the computer vision model 210, which should produce the output of "banana" for the identity of the unpackaged item 120 in each of the images 220a-e despite the differences in the input images 220a-e. For example, different kiosks 110 may have more or fewer cameras included in the respective imaging systems, cameras with different capabilities (e.g., lower or higher resolutions, different frequency or color ranges, zoom capabilities), or different lighting conditions that would induce differences in the images 220.

Additionally, differences and natural variation in the unpackaged items 120 themselves can induce differences in the images 220. For example, a first user may present a bunch of bananas that are overripe while a second user may present a single unripe banana, which affects the size, weight, color, and texture of the bananas in the separate images 220. Additionally, how the user presents the banana can affect the image thereof. For example, a given banana may display different features to a camera if rotated by ninety degrees. In view of the potential differences in image collection condition and image contents, the computer vision model 210 is initially trained to identify each of these images 220 as including bananas (and not including, for example, summer squash, yams, or some other unpackaged item).

In various embodiments, the computer vision model 210 is connected to a product catalog 230 for a given deployment that identifies the various potential unpackaged items 120 that the computer vision model 210 is to distinguish between. For example, a first deployment may offer Cavendish bananas, plantains, and organic Cavendish bananas that the computer vision model 210 can provide as distinct outputs for a set of images 220. In another example, a second deployment may offer Cavendish bananas and organic Cavendish bananas (and not plantains), and the computer vision model 210 may therefore not have to distinguish whether a given image 220 includes a plantain versus a regular or organic Cavendish banana, but just between Cavendish and organic Cavendish bananas. As will be appreciated, distinguishing two bananas of the same cultivar from one another may be difficult or impossible without an external input (e.g., a sticker reading "organic", a user remembering that the selected banana was a regular banana), accordingly, as is described in greater detail in regard to at least FIGS. 3A-3C, after an initial training to identify individual types of items, the computer vision model 210 is retrained to identify product categories (e.g., banana-like objects rather than Cavendish/organic Cavendish/plantain individual identities) and optionally ask for the additional input for the final determination to be made.

In various embodiments, the product catalog 230 is hosted on the same computing device as a given instance of the computer vision model 210 analyzing the images 220, but in other embodiments, the computer vision model 210 may connect to a remote computing device that hosts the product catalog 230 via a network connection. Additionally, in some embodiments, as various items are identified by the computer vision model 210 (and the transaction for those items is completed), the computer vision model 210 or the kiosk 110 may update an inventory count in the product catalog 230.

The computer vision model 210, after identifying the item in the image 220 provides that identity to the kiosk 110 to add that item to (or remove that item from) an ongoing transaction register. The kiosk 110, in turn, may display the identified item to a user, perform various calculations related to the transaction (e.g., weighing the item and applying the correct price per unit or price per weight multiplier), or prompt the user for additional input. In various embodiments, the computer vision model 210, whether directly or via the kiosk 110, may send commands to the imaging system 140 to provide additional images of a given item, adjust image collection settings, or the like.

In various embodiments, the computer vision model 210 may be locally hosted on each kiosk 110 of a deployment (e.g., as a separate instance for every individual kiosk 110 in a given deployment), hosted in a central server connected to each kiosk 110 in a deployment (e.g., as a central model for use by several terminals in a given store), or in a server used across deployments (e.g., as a general or baseline model for use in different stores). Local variation (e.g., in lighting conditions, in capabilities of the imaging system 140, product availability, etc.) may be localized to given kiosks 110 based on permutation files or more locally hosted instances of the computer vision model 210. The permutations allow for localized adjustments to account for regional or store-by-store variations in items (e.g., avocados in Texas may be larger than in Alaska, store A may sell tomatoes with a different hue than store B), or localized imaging conditions (register A may be under fluorescent lights, while register B is under incandescent lights) to thereby adjust to different characteristics in the image 220 collected by different imaging systems 140.

Additionally, one or more of the computer vision model 210 and the kiosk 110 may be in communication with a loss prevention system 240. For example, when the computer vision model 210 and the kiosk 110 register a mismatch between the identity of an item determined from an image 220 by the computer vision model 210 and the identity indicated by a user of the kiosk 110, a signal is sent to a loss prevention system 240. In various embodiments, the loss prevention system 240 may signal an associate to provide aid at the kiosk 110 for inputting the correct identity for the item in question, or prompt the kiosk 110 to request confirmation from the user for the identity of the initially mismatched item identities. In some embodiments, when a mismatch is confirmed as correct (e.g., when the computer vision model 210 incorrectly identified the item), the loss prevention system 240 signals the computer vision model 210 to save the image 220 that was initially mismatched for use in later training as an edge case or as a false negative for the item in question.

Figure 3B:
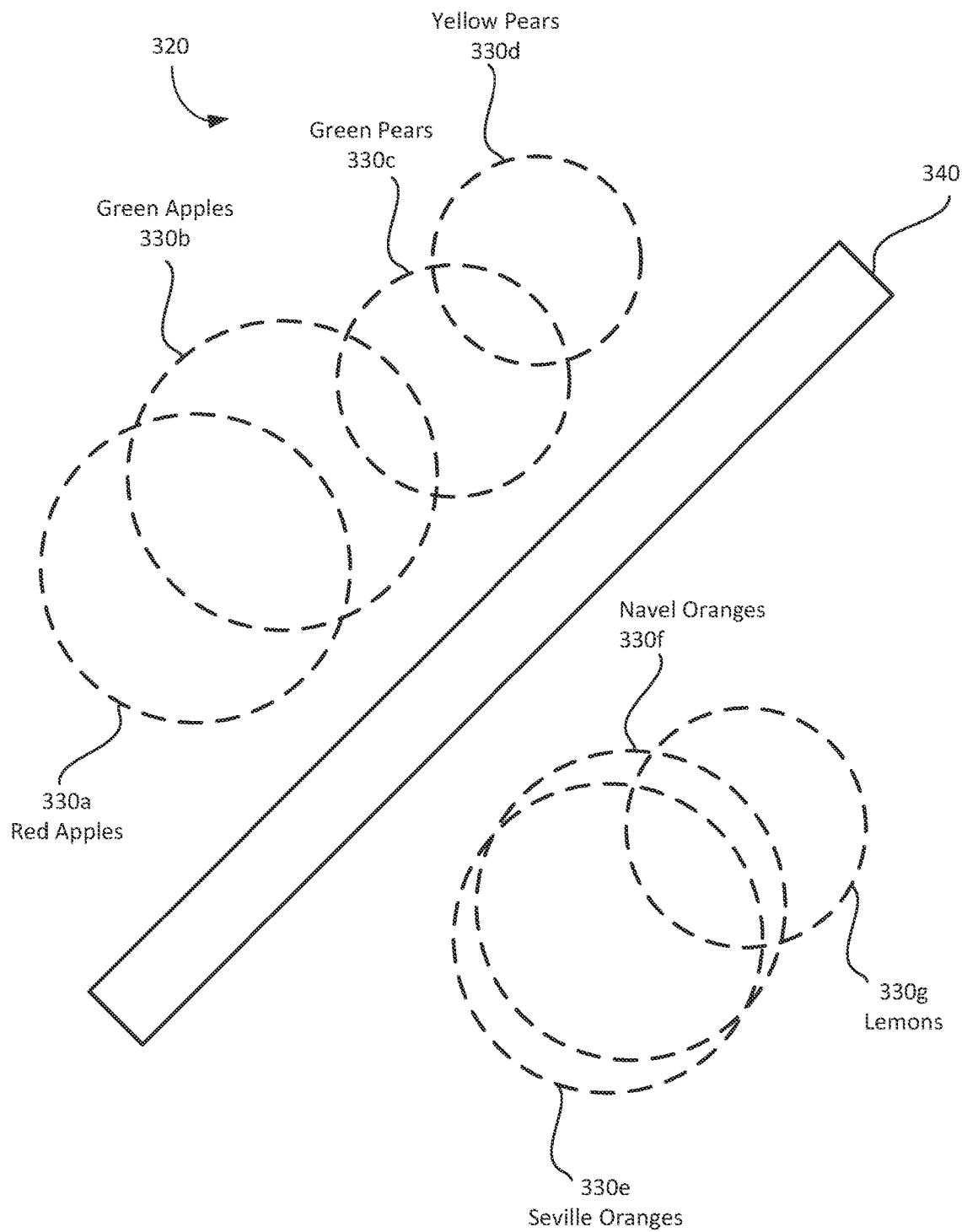
Figure 3C:
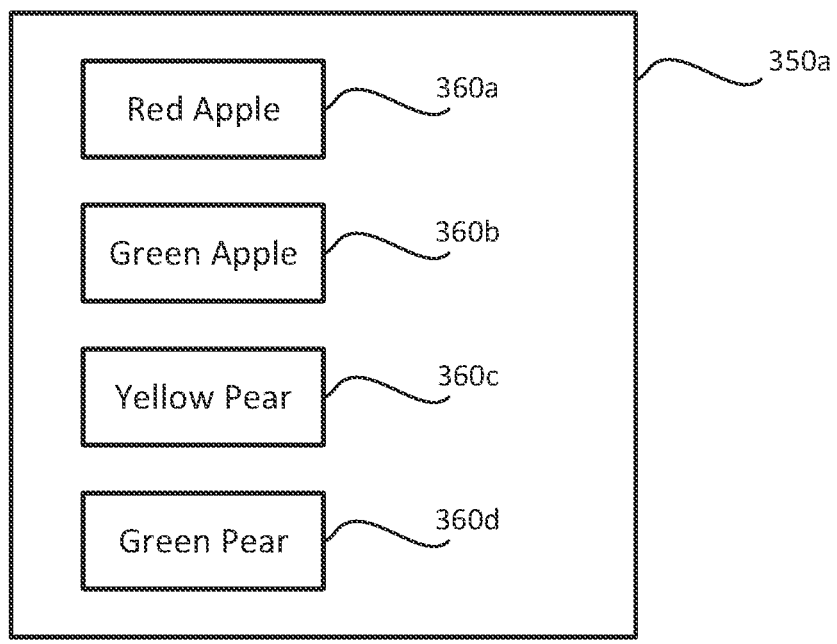
Figure 3C:
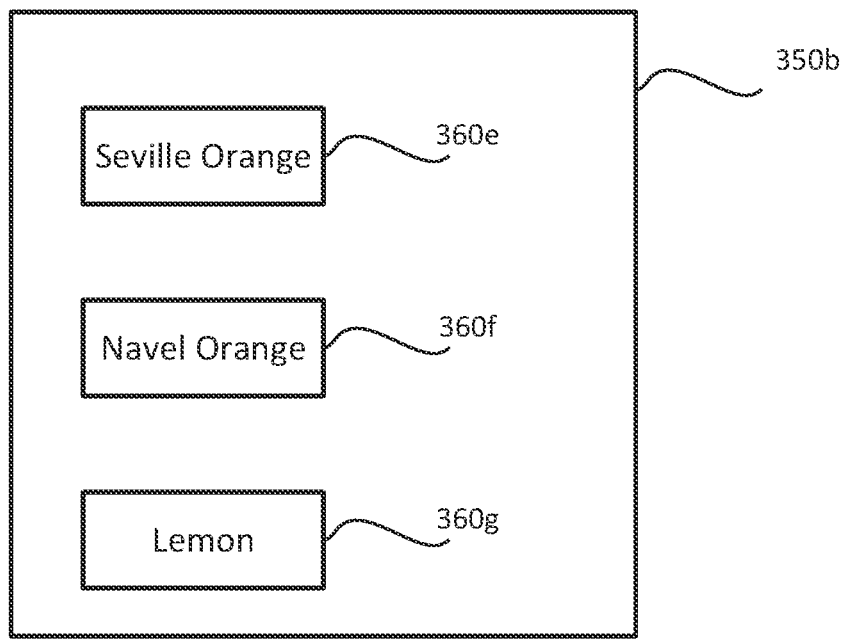

FIGS. 3A-3C illustrate item classification and distinguishing schemes, according to embodiments of the present disclosure. Although a given number of items and various values related to the classification and distinguishing schemes are given in the present disclosure, it will be appreciated that more or fewer items and product categories are possible with various different items, and that the listed values are provided as non-limiting examples for purposes of explanation and illustration of the inventive concepts of the present disclosure FIG. 3A illustrates a confusion matrix 310 (also referred to as an error matrix), according to embodiments of the present disclosure. The illustrated confusion matrix 310 provides a first visualization of item identification and misidentification by a computer vision model 210 for a set of produce items (as unpackaged items) that include red apples, green apples, green pears, yellow pears, Seville oranges, navel oranges, and lemons. Each of the rows indicate the actual item presented to the computer vision model 210, and each of the columns indicate what identity the computer vision model 210 recognized the item as. Each of the values shown in a given intersection indicate the percentage of time that a given item presented is recognized as a corresponding item. For example, the computer vision model 210 has recognized red apples presented in images as red applies seventy percent of the time and as green apples thirty percent of the time.

The confusion matrix 310 tallies decisions made by the computer vision model 210 across a plurality of images that correspond to the selected identities supplied by a human user for a corresponding image. Matched identities, where the human user and the computer vision model 210 identified a given image as containing the same unpackaged item (e.g., red apple/red apple, green apple/green apple) are presented diagonally in the confusion matrix 310, while cross-identified entries, where the human user and the computer vision model 210 disagree on the identity of the unpackaged item (e.g., red apple/green apple, green apple/red apple) are shown off of the diagonal. Accordingly, the tallies represent a number of times a given identity pairing has been recorded across a plurality of images, but may omit the confidence in any given selection. For example, the computer vision model 210 may select "red apple" as a candidate identity for an unpackaged item in a first image with a ninety-nine percent certainty, and "red apple" from a second image with a thirty percent certainty, either of which may match or not match the identity indicated by the human user, and the resulting identity pair will be tallied accordingly in the confusion matrix 310.

Values below one percent are omitted from the illustration of the confusion matrix 310 for clarity, but may be present and accounted for. For example, the confusion matrix 310 indicates that lemons are identified as either lemons of navel oranges ninety-nine percent of the time, with the remaining one percent attributable to some or all of the other items, an unlisted item, an item that has been removed from a product catalog 230 but historically caused confusion (e.g., previously identifying the lemon as a pomelo one percent of the time when pomelos are no longer an option for selection), results removed or ignored as known or intentional errors, or the like.

For example, when the computer vision model 210 correctly identifies a parsnip as a parsnip, but receives erroneous feedback from an associate (who has never seen a parsnip before) that the item is a "white carrot" that the computer vision model 210 "misidentified", the confusion matrix 310 may omit this data point because the computer vision model 210 was not the entity that misidentified the item in question. Similarly, when a user has intentionally mislabeled an item as a second item (e.g., to receive a lower price associated with the second item), the data point indicating that the computer vision model 210 "misidentified"

an image as containing the first item may be ignored or omitted when determining that the computer vision model 210 confuses the two items.

Accordingly, because the computer vision model 210 produces unreliable identifications of the unpackaged items, and the human users who provide feedback via the selected identities may also be unreliable, the confusion matrix 310 may be curated to ignore some of the tallied identification pairs. In various embodiments, an operator may set various thresholds for confusion to exclude an entry from the confusion matrix 310, to thereby avoid indicating the computer vision model 210 is the entity confusing the two or more unpackaged items. For example, a first item may need to be confused by the computer vision model 210 with a second item at least X percent of the time, across at least Y instances, or combinations thereof to be considered as confusable by the computer vision model 210. Using the confusion threshold, an operator may curate to the confusion matrix 310 to avoid indicating that the occasional mistaken identity (whether accidental or malicious) from the human user negatively affects the accuracy of the confusion matrix 310.

FIG. 3B illustrates a clustered differentiation space 320, according to embodiments of the present disclosure. In various embodiments, the computer vision model 210 may be trained using various intrinsic features of the unpackaged items to differentiate items from one another including size, shape, color, patterns, textures, density (when a scale 115 provides supplemental input), etc., and combinations thereof. Although shown in a two-dimensional representation of a differentiation space 320 in FIG. 3B, each of the features analyzed by the computer vision model 210 may be represented on a different axis in an n-dimensional differentiation space 320.

FIG. 3B shows a plurality of identity spaces 330a-g (generally or collectively, identity spaces 330) that illustrate overlaps in the features used by the computer vision model 210 to identify a given item that correspond to the cross-identification of produce items discussed in the confusion matrix 310 in FIG. 3A.

For example, a first identity space 330a corresponding to red apples is shown with significant overlap with a second identity space 330b corresponding to green apples (e.g., with cross-confusion rates of thirty and thirty-five percent according to the confusion matrix 310 of FIG. 3A). Similarly, the second identity space 330b is shown partially overlapping with a third identity space 330c corresponding to green pears (e.g., with cross-confusion rates of five and five percent according to the confusion matrix 310 of FIG. 3A), but the first identity space 330a is not shown overlapping the third identity space 330c, as no confusion between red apples and green pears (at least included in or above a confidence threshold) is indicated in the confusion matrix 310. The fourth identity space 330d corresponding to yellow pears shows a similar behavior based on identified cross-confusion between the yellow pears and the green pears (per the third identity space 330c), where the computer vision model 210 misidentifies yellow pears as green pears twenty percent of the time, but does not misidentify green pears, green apples, or red apples as yellow pears.

These misidentifications by the computer vision model 210 describe a group of products that the computer vision model 210 can confuse between one another. Because the actual identity of an unpackaged item is unknown to the computer vision model 210 at the time of analysis, this confusion is transitive across the members of the group. Accordingly, when an image is received of an apple-like or pear-like item, the computer vision model 210 may identify the item as any one of a red apple, green apple, green pear, or yellow pear, if forced to select an individual identity (e.g., an individual identity having a highest confidence for selection).

As indicated by a divider 340, there are some items that the computer vision model 210 is not confused between. For example, no confusion is shown between any of a first group including red apples, green apples, green pears, and yellow pears and a second group including Seville oranges, Navel oranges, and lemons (respectively represented in the differentiation space 320 by the fifth identity space 330e, sixth identity space 330f, and seventh identity space 330g). The fifth through seventh identity spaces 330d-g show various internal overlaps to indicate cross-confusion between the member citrus fruits corresponding to the confusion matrix 310, but define a group of orange-like objects that are distinguishable (e.g., are without overlap in the differentiation space 320) from the group of apple-like objects including the first through fourth 330a-d identity spaces.

Accordingly, as there is no known confusion by the computer vision model 210 when comparing apples to oranges or apple-like objects to orange-like objects, the two groups offer greater confidence in differentiation from one another and identify potential items that the computer vision model 210 may confuse with one another. Therefore, rather than attempting to increase the confidence in a given identity determination (e.g., from seventy percent certain that a presented item is a red apple to ninety-five percent sure), the computer vision model 210 can simply return the product category as the output of an identity determination, which may be augmented with further inputs or selections (e.g., from a human user of a kiosk 110) if needed.

FIG. 3C illustrate category groupings, according to embodiments of the present disclosure. A first product category 350a (generally or collectively, product category 350) is shown with the members 360a-d (generally or collectively, members 360) and a second product category 350b is shown with the members 360e-g that identified from the confusion matrix 310 of FIG. 3A as being confused with one another by the computer vision model 210.

When an image of any one of the members 360 is received by the computer vision model 210, the computer vision model 210 identifies the corresponding product category 350. In various embodiments, a kiosk 110 or loss prevention system 240 used in conjunction with the computer vision model 210 may use the product category 350 as a single entity, or treat the constituent members 360 as equally valid identities for an item until additional input is received.

For example, when a user presents a red apple at a kiosk 110 for checkout, the kiosk 110 sends an image of the red apple to the computer vision model 210, which returns the first product category 350a to the kiosk 110. The kiosk 110 may then display, in a Graphical User Interface (GUI), the members 360 of the first product category 350a for selection by the user.

For example, the kiosk 110 may display icons for individual selection for each of the first through fourth members 360a-d. In another example, when a purchase history for the user is known, the kiosk 110 may retrieve additional input that the user purchases green apples more often than red apples, green pears, or yellow pears, the kiosk 110 may initially proceed with the transaction with the item identity as "green apple", which the user may correct if desired.

Similarly, the kiosk may use the transaction history to exclude or prioritize various members 360 for individual selection. For example, if the user previously selected "red apple" as the identity for a first item added to a transaction, the odds that the user will make a second scan of red apples may be reduced to temporarily remove "red apple" as a member 360 of the product category 350, to thereby allow faster (or automatic) selection of another member 360 of the product category 350. Additionally or alternatively, the display of the "red apple" option in a GUI showing the product category 350 may be deemphasized (e.g., shown at the end of a list, grayed out, at a smaller size) to reflect the reduced odds of the user making two purchases of red apples in a single transaction.

In another example, the kiosk 110 may prompt the user to identity the presented item (e.g., via a GUI or audio prompt) and will accept any response of the first through fourth members 360a-d as valid without further question or activation of a loss prevention system 240. Accordingly, the computer vision model 210 may allow a user to present a red apple for check out, claim that the item is a green pear, and allow the transaction as being "close enough" within the realm of uncertainty in computer vision and product management to be worth allowing to proceed without disrupting the customer or the transaction. However, selection of a member 360 from a different product category 350 may cause the computer vision model 210 to cause the kiosk 110 to prompt the user for confirmation or activate a loss prevention system 240. For example, when the computer vision model 210 identifies a presented item as a member 360 of the first category 350a, but the user (e.g., via PLU input) identifies the item as the fifth member 360e (e.g., a Seville orange) from the second category 350b, the kiosk 110 may display in a GUI icons for the first product category 350a to suggest re-selection to the user, display icons for the second product category 350b to confirm section from the user, or provide an audio prompt or yes/no selection in a GUI to confirm the initial selection.

In some embodiments, when a mismatch between the identity of the computer vision model 210 and the user selection is confirmed, the image from that transaction is saved for future use in retraining the computer vision model 210. Similarly, the confusion matrix 310 can be updated to potentially combine the two product categories 350 if the computer vision model 210 can no longer differentiate between the two product categories 350.

Additionally, as various new items are added to a product catalog 230, the computer vision model 210 collects new images of the new items to determine whether to add the new items to existing product categories 350, combine two or more product categories 350 linked by the new item (which can be confused by the computer vision model 210 with at least one member 360 from each of the two or more product categories 350), or create one or more new product categories 350 when the new items do not fit into the existing product categories 350.

Similarly, when an existing item is removed from a product catalog 230, the computer vision model 210 may reanalyze the product categories 350 to determine whether one product category 350 should be split into two or more product categories 350. For example, if a retailer stopped offering green pears, no confusion between red apples or green apples has been noted for yellow pears, and the group of "apple and pear-like items" may be split into an "apples" group and a "yellow pears" group without risk of confusion between the members 360 of two groups. Alternatively, the computer vision model 210 may retain the "apple and pear-like items" first product category 350a in anticipation of green pears returning to the product catalog 230 or as a "honeypot" item to identity known misidentifications by human users.

Because the confusion matrix 310 may be trained with data (and continually updated with new data) from images captured during "real-world" conditions from deployed kiosks 110 and imaging systems 140, both the determinations made by the computer vision model 210 and the feedback from the human users (annotating the training images) may be unreliable. Accordingly, the computer vision model 210 may use a confusion threshold before indicating a given unpackaged item should be included as a member 360 of a product category 350. For example, if a user incorrectly identifies a steak (that the computer vision model 210 correctly identified as a steak) as a red apple, the confusion matrix 310 may include one tallied entry for the determined identity of "steak" with the selected identity of "red apple". Because the human user (not the computer vision model 210) is responsible for the error, the product category 350 for "steak-like items" should not be updated to include red apples. Accordingly, when the number or percent of tallied entries of steak/red apple fall below the confusion threshold, the computer vision model 210 excludes those human-misidentified items from the product category 350.

Figure 4:
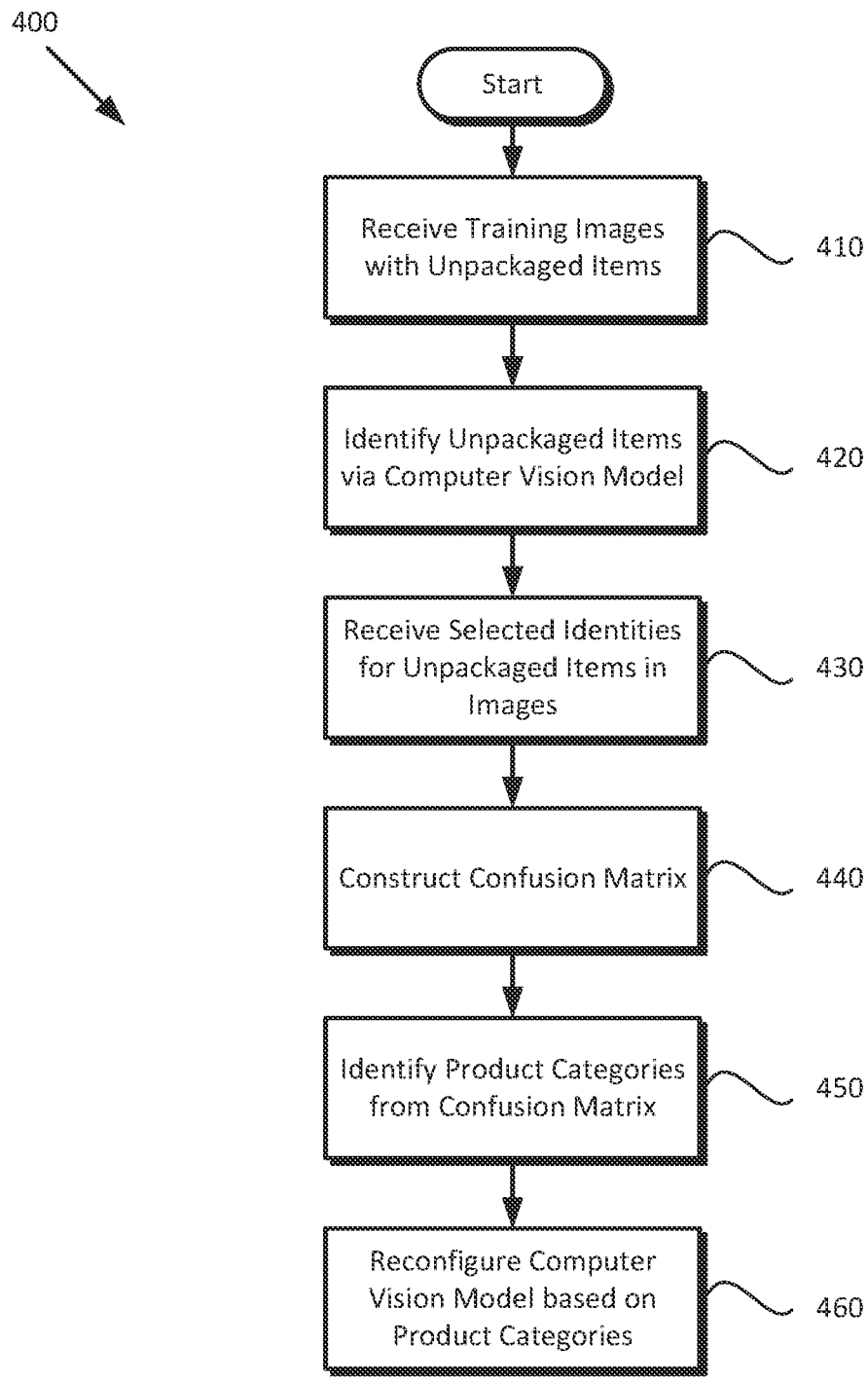
FIG. 4 is a flowchart of a method for enrollment and training of a computer vision model, according to embodiments of the present disclosure.

FIG. 4 is a flowchart of a method 400 for enrollment and training of a computer vision model 210, according to embodiments of the present disclosure.

Method 400 begins at block 410, where a computer vision model 210 receives a plurality of training images. In various embodiments, the training images are captured by the imaging systems 140 of one or more kiosks 110, and each image includes at least one unpackaged item therein. The training images of the unpackaged items may include various views of the unpackaged items available for handling according to a product catalog 230 taken in various lighting conditions, with different instances of the items to identify (e.g., pictures of different bananas to train how to identify bananas), with different numbers of the items present (e.g., one coconut versus a bunch of coconuts), with the items held in a container or left loose in a scanning area, with different cameras, with different supplemental sensor devices, etc. These image data are used to train the computer vision model 210 to identify individual classes of items from one another (e.g., apples versus oranges, apples versus pears) according to various supervised or unsupervised machine learning training regimens.

In various embodiments, the some or all of the training images and annotations for the identities of the unpackaged items (when used in a supervision learning mode) in the images are received as live or deployed images from human users who may be aware or unaware that the selected identities and provided images are being used to train the computer vision model 210.

At block 420, once the computer vision model 210 is trained to identify individual unpackaged items, the computer vision model 210 identifies, for each image over a plurality of images, a candidate identity for each unpackaged item in an image. In various embodiments, the plurality of images that the computer vision model 210 identifies the individual items from a plurality of images which may include some or all of the training images used in block 410 as well as "live" or deployed images from one or more imaging systems 140 in use with various operators. In various embodiments, the computer vision model 210 selects one item with the highest confidence that a given image includes.

For example, when presented with an image of a red apple, the computer vision model 210 may determine with ninety-five percent certainty that the image includes a red apple, and with five percent certainty that the image includes a peach, and would accordingly indicate that the candidate identity for the unpackaged item in the image is a red apple. In contrast, when presented with an image of a peach, the computer vision model 210 may determine (e.g., due to poor initial training, unusual imaging conditions, or an unusual appearance of the peach) with ninety-five percent certainty that the image includes a red apple, and with eighty-five percent certainty that the image includes a peach, and would accordingly indicate that the candidate identity for the unpackaged item in the image is a red apple, despite the actual identity being a peach.

Although generally discussed regarding analysis of images that contain a single unpackaged item, the computer vision model 210 may distinguish between multiple items in a single image. For example, the computer vision model 210 may analyze an image containing two red apples to correctly identify a first red apple and a second red apple, partially correctly identify one red apple and one other unpackaged item (e.g., a one peach) or only a single red apple (e.g., when the second red apple is obscured by the first), or incorrectly identify that the image contains no red apples (e.g., not seeing the red apples or identifying the red apples as something else). In various embodiments, such as when the unpackaged item in question is sold by the unit, the computer vision model 210 may provide a count of each identified item in an image (e.g., X red apples). In other embodiments, such as when the unpackaged item in question is sold by weight, the computer vision model 210 may provide an identity and allow the kiosk 110 (e.g., via a scale 115) to apply a corresponding weight to perform the transaction.

At block 430, the computer vision model 210 receives selected identities for unpackaged items in the images analyzed per block 420. In various embodiments, these selected identities are received from various human users who have manually (via human vision and decision making processes) what the identity of a given unpackaged item in a given image is. These selected identities, when provided with the corresponding training images and determinations made by the computer vision model (per block 420), produce a supervised training dataset to confirm whether the computer vision model 210 correctly identified the unpackaged item in the corresponding images.

Block 420 and block 430 may run in parallel until a threshold number of images are received with selected identities before method 400 proceeds to block 440, and may continue running (for additional training) as method 400 proceeds. Additionally, the various images and selected identities may be curated to remove outlier data points, known incorrect pairings, outdated images, or the like. Accordingly, a curated training dataset is provided to cross-reference what the computer vision model 210 identifies an unpackaged item as and what human users say the corresponding unpackaged item is in the same transaction over a series of transactions.

At block 440, the computer vision model 210 constructs a confusion matrix 310 using the selected identities (received per block 430) and the corresponding candidate identities (identified per block 420) from the unpackaged items available in the product catalogs 230 for the plurality of images collected per block 420 and block 430. In various embodiments, the confusion matrix 310 tallies how often a given presented item (as decided by the selected identities received per block 430) is identified by the computer vision model 210 with a given item (as indicated by the selected identities received per block 420). In various embodiments, the confusion matrix 310 may be curated to remove entries with an insufficient number, percentage of identifications below a confidence threshold, or those entries suspected to be known errors in identification.

At block 450, the computer vision model 210 identifies product categories 350 from the confusion matrix 310. The product categories 350 include various members 360 that include at least a first unpackaged item and a second unpackaged item from the product catalog 230 that the computer vision model 210 distinguishes between one another below a given confidence threshold or has confused with one another at least a threshold number of times according to the confusion matrix 310.

For example, the confusion matrix 310 in FIG. 3A indicates that out of one hundred percent of the images that human users indicated to include red apples, the computer vision model 210 also identified the images as containing red apples eighty percent of the time, but identified the images as containing green apples twenty percent of the time. Accordingly, a product category that includes red apples would also include green apples as the computer vision model 210 has improperly distinguished between red and green apples. If the image data of one million images indicate that a human user identified one image as containing a red apple, but the computer vision model 210 identified the image as containing a steak (e.g., to maliciously relabel an item to receive a lower price), the computer vision model 210 may exclude steaks from the product category 350 containing red apples due to the infrequently inclusion of this identity pairing in the image data and confusion matrix 310. By excluding outliers, infrequently identifications, or known misidentifications from the confusion matrix 310, the computer vision model 210 can ensure the accuracy of the product categories 350 developed therefrom even when the training data set is unreliable or the users providing supervision are untrusted.

At block 460, the computer vision model 210 is reconfigured to identify the product category 350 instead of the individual identities of the members 360 of that product category 350 when analyzing a given image and determining that the given images includes one of those members 360. For example, when the computer vision model 210 is originally trained to recognize and distinguish between bananas and plantains, a product category 350 that includes bananas (e.g., as a first unpackaged item) and plantains (e.g., as a second unpackaged item) can be created to reconfigure the computer vision model 210 to return the product category 350 whenever an image is identified as including either a banana or a plantain instead of the highest confidence response for one of banana or plantain.

Figure 5:
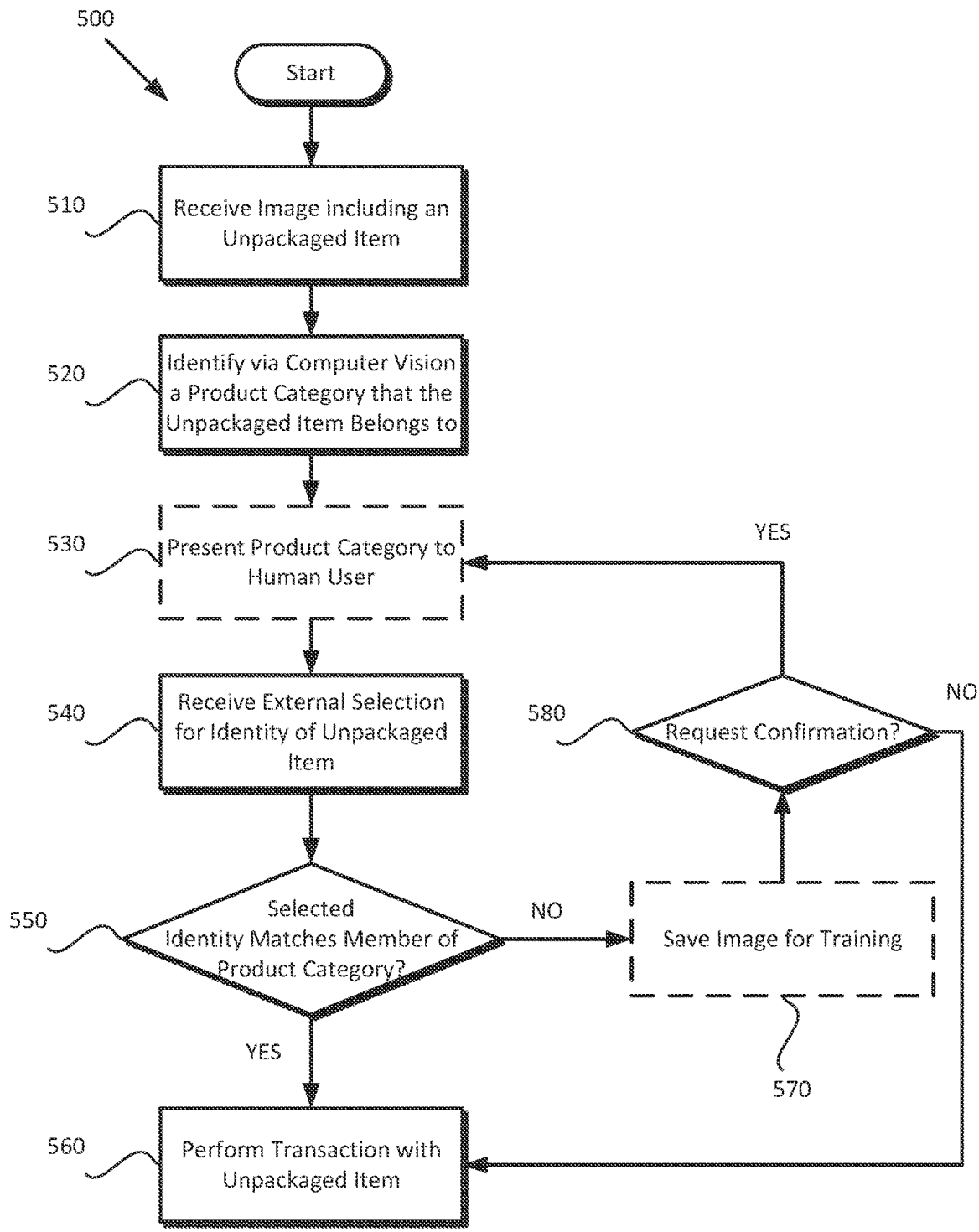
FIG. 5 is a flowchart of a method of use and deployment of a computer vision model, according to embodiments of the present disclosure.

Method 400 may conclude after block 460, or continue running as the reconfigured computer vision model 210 is deployed, as per method 500 discussed in relation to FIG. 5 to continually improve the computer vision model 210 as more image data are received.

FIG. 5 is a flowchart of a method 500 of use and deployment of a computer vision model 210 configured to identify product categories 350 instead of or in addition to individual product identities, according to embodiments of the present disclosure.

Method 500 begins at block 510, where a computer vision model 210 receives an image including an unpackaged item. In various embodiments, an imaging system 140 captures various images which may include an unpackaged item that is to be included in a transaction, or includes a packaged item that is to be included in a transaction, and sends all such images to the computer vision model 210 to determine whether an unpackaged item is included therein. If the image includes an unpackaged item, method 500 begins; otherwise, method 500 concludes after the computer vision model 210 determines that no unpackaged items are included in the image.

At block 520, the computer vision model 210 identifies a product category 350 that the unpackaged item in the image (received per block 510) belongs to. In various embodiments, the computer vision model 210 performs a computer vision analysis of the image to identify the most item with the highest confidence as being included in the image. In another example, instead of returning the individual identity of that item, the computer vision model 210 returns the product category 350 that the individual item belongs to.

In various embodiments, method 500 optionally proceeds from block 520 to block 530 or to block 540. Accordingly, the determination of the product category 350 (per block 520) may be used initially in the foreground when proceeding to block 530 or initially in the background when proceeding to block 540 when handing a transaction related to the unpackaged item in question.

At block 530, the computer vision model 210 provides (e.g., via a kiosk 110) the product category 350 to the human user attempting to perform the transaction related to the unpackaged item in question. In various embodiments, the product category 350 may be provided in a GUI (e.g., displaying icons associated with each member 360), provided by an audio cue, or combinations thereof.

At block 540, the computer vision model 210 receives (e.g., via a kiosk 110) an external selection for the identity of the unpackaged item in question. If the product category 350 includes a single valid member 360, the external selection may come from the product catalog 230. Otherwise, when the product category 350 that the unpackaged item belongs to includes two or more unpackaged items that the computer vision model 210 cross-identifies with one another or otherwise confuses between one another, the computer vision model 210 may specifically request external selection or await external selection from the user (e.g., via the kiosk 110) or a database associated with the kiosk 110. The external selection identify which one of the unpackaged items in the product category 350 or from another product category 350 the presented item is to be specifically identified as. In various embodiments, the user of a kiosk 110 (or an associate helping the user) provides the external verification via a GUI, pin-pad, barcode scanner, or the like. In other embodiments, a kiosk 110 or other database provides a most-frequently selected item from the product category 350 to the computer vision model 210 as the selected identity.

In various embodiments, the external selection is received by the computer vision model 210 without prompting a human user for input to distinguish between members of the product category when the members of the new product category fall within a similarity window for the items within the product category 350. For example, the kiosk 110 may automatically select one item according to on a purchase history of the human user (e.g., via a loyalty program database) indicating above a frequency threshold that one of the members 360 is selected more than the other members 360 of the product category 350 at or above a frequency threshold for selection. In another example, when a price difference between the various members 360 (or the total transaction based on weight or number of identified unpackaged items in a checkout area) is within a similarity window, the operator may prefer to expedite the transaction over ensuring the accuracy of the transaction, and allow the kiosk 110 to automatically select one member 360 (e.g., the least expensive, most popular, or highest stock level item).

In some embodiments, the similarity window may be dynamically adjusted to manage the competing goals of checkout speed and transaction accuracy so that the similarity window (for when to automatically select the one member of the product category) increases in response to a demand for kiosks 110 exceeding a demand threshold. For example, when a rush of customers is expected or detected at the kiosks 110, the similarly window may allow for automatic selection of items from a product category 350 when the transaction is expected to be less than X in value. In contrast, during a slow time or when no line is detected at the kiosks 110, the similarly window may be decreased to allow for automatic selection of items from a product category 350 when the transaction is expected to be less than X/2 in value.

In cases where the kiosk 110 automatically selects a member 360 of the product category 350, the user is permitted to later override the selection and provide an external selection for block 540 that replaces the machine-generated selection.

At block 550, the computer vision model 210 (or kiosk 110) determines whether the external selection (received per block 540) indicates a selected identity that matches with the identity of a member 360 of the product category 350 (identified per block 520). When the selected identity matches a member 360 of the product category 350, method 500 proceeds to block 560. In various embodiments, method 500 optionally proceeds from block 550 to block 570 or to block 580 when the selected identity does not match the product category 350 identified by the computer vision model 210 (per block 520).

At block 570, the computer vision model 210 saves the image of the object that was initially mismatched to the initial product category 350 identified. In various embodiments, block 570 corresponds to block 420 of method 400 discussed in relation to FIG. 4 to supply a false-positive example for future training purposes or an edge case one a humane user provides a new selected identity that matches the identity of the unpackaged item in question.

At block 580, the computer vision model 210 determines whether to request confirmation from the user between the mismatch of the externally selected identity and the identities of the members of the product category 350 identified by the computer vision model 210. When the computer vision model 210 determines that confirmation is not needed, method 500 proceeds to block 560 and uses the externally-provided identity to perform the transaction. When the computer vision model 210 determines that confirmation is needed, method 500 proceeds to block 530 to prompt the user for confirmation. In various embodiments, prompting the user for confirmation may be performed before activating a loss prevention system 240 or in conjunction with a loss prevention system 240.

For example, when the computer vision model 210 initially presents a first product category 350 (in a first instance of block 530) and the user selects an item not in that first product category 350 (in a first instance of block 540), the computer vision model 210 may request confirmation from the user (per block 580), and on receiving a confirmation or a change in the user-provided item identity, may continue to perform the transaction with the confirmed or changed identity for the item.

In another example, consider when the computer vision model 210 initially identifies (per block 520) but does not present a first product category 350 that an unpackaged item is believed to belong to, and the computer vision model 210 receives a selection for the identity from a human user (per block 540) that is not a member 360 of the first product category. In response, the computer vision model 210 presents the product category 350 to the human user (per a first instance of block 530) to confirm the selection provided (per block 540) to give the user an opportunity to correct a human error or inform the computer vision model 210 an error is computer vision item identification for later correction. In various embodiments, the product category 350 that the computer vision model 210 provides in block 530 when requesting confirmation may include one or both of the product category 350 initially identified from the image (per block 520) or the product category 350 that the selected item (per block 540) belongs to.

At block 560, the kiosk 110 performs the transaction with the unpackaged item as identified. In various embodiments, the kiosk performs the transaction by adding or removing the unpackaged item from a transaction register or inventory system. Method 500 may then conclude.

Figure 6:
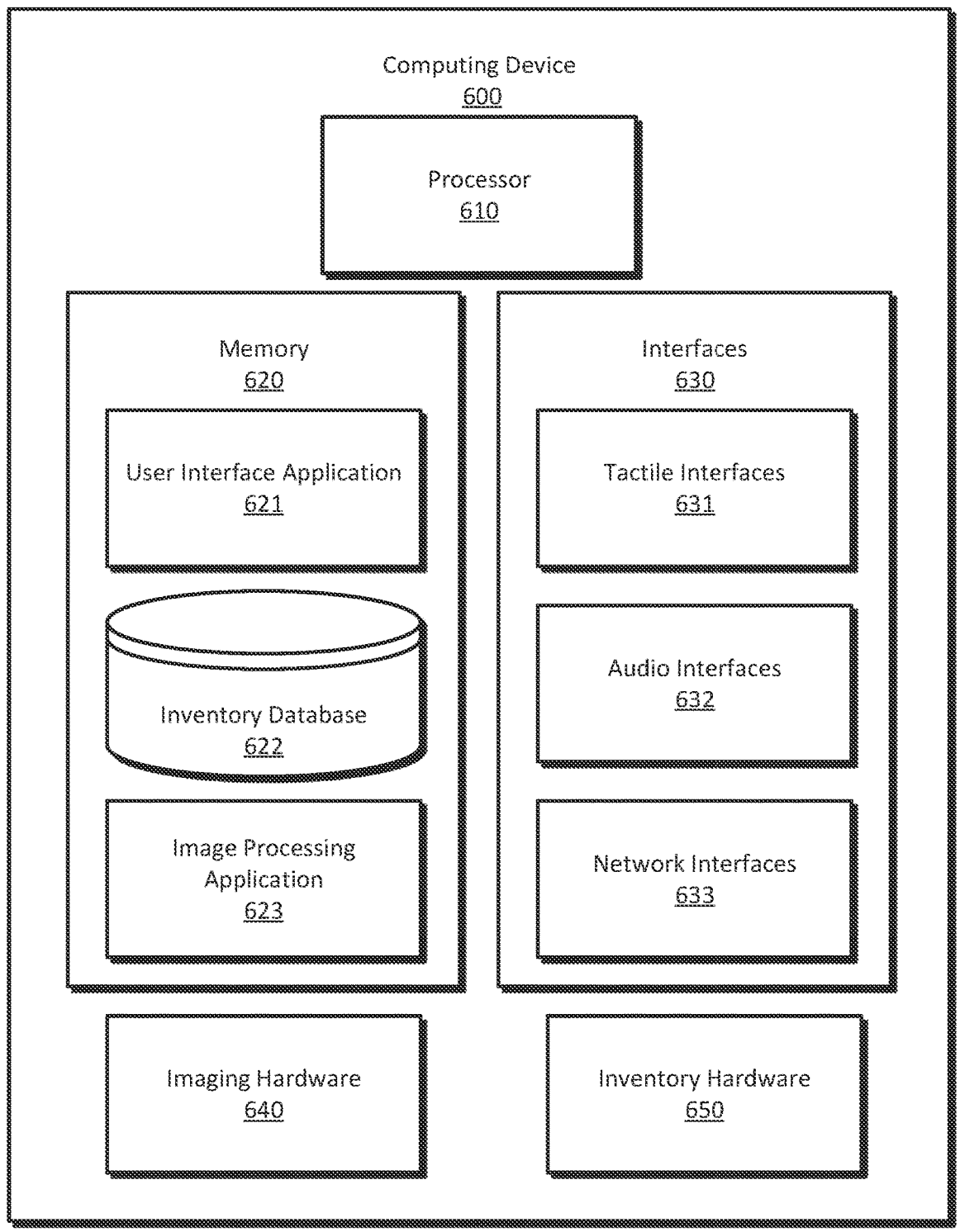
FIG. 6 illustrates hardware of a computing device, such as may be used to provide the computer vision model or the terminal, according to embodiments of the present disclosure

FIG. 6 illustrates hardware of a computing device 600, such as may be used to provide the computer vision model 210, a kiosk 110, and other systems described according to embodiments of the present disclosure. The hardware of includes a processor 610, a memory 620, interface 630, and may include other components such as imaging hardware 640. The computing device 600 is generally under the control of an operating system (not shown). The processor 610 is included to be representative of a single CPU (Central Processing Unit), multiple CPUs, a single CPU having multiple processing cores, and the like.

The memory 620 may be a persistent or a volatile storage device. Although the memory 620 is shown as a single unit, the memory 620 may be a combination of fixed and/or removable non-transient computer readable memory storage devices, such as fixed disc drives, solid state drives, SAN storage, NAS storage, removable memory cards or optical storage. The memory 620 may be part of one virtual address space spanning multiple primary and secondary storage devices.

As shown, the memory 620 includes a user interface application 621, an inventory database 622, and an image processing application 623. The user interface application 621 can include the software instructions, Application Program Interfaces (APIs), and drivers needed to receive inputs from and provide outputs to the various control hardware of the computing device 600 in association with a human user (e.g., via GUI or audio prompter). The inventory database 622, which may be omitted or accessed on a remote server via a network connection for some use cases, identifies the various individual items available for selection and the categories available for identification by the computer vision model 210. In various embodiments, the inventory database 622 tracks and updates the number of items selected to place replenishment orders or the like. The image processing application 622 may include the computer vision model 210 and/or various image correction or compilation software. For example, the image processing application 622 may include various camera control software or firmware for controlling and processing images collected via the imaging hardware 640 or forming composite images from multiple images or related data collected by the imaging hardware 640.

The interfaces 630 may be any type of device to manage input to or output from the computing device 600 and can include tactile interfaces 631 (e.g., push-buttons, selector switches, and touch screens) to receive manual inputs from users, audio interfaces 632 (e.g., microphones and speakers) to provide audio outputs and accept audio inputs from users, and network interfaces 633 that enable the computing device 600 to communicate with other computers (e.g., NFC scanners, WiFi antennas, Bluetooth antennas, Ethernet ports, camera systems, inventory servers, etc.).

The imaging hardware 640 includes various hardware to capture images (e.g., digital cameras), control the capture of images (e.g., motors to move where cameras are positioned or focused), range finding systems, and the like. In various embodiments, the digital cameras can include multi-perspective digital cameras located at different locations or that are offered separately from a given computing device 600 to provide alternative views of an item or to provide a composite image of a given item. Various inventory hardware 650 may be used in conjunction with the imaging hardware 640, which may include optical barcode scanners, Radio Frequency Identification (RFID) scanners, RFID deactivators, scales, conveyors, or the like.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. A method comprising:
    identifying, using a computer vision model, at least one product category that includes at least a first unpackaged item and a second unpackaged item that the computer vision model indicates as being misidentified for each other above a confusion threshold; and reconfiguring the computer vision model to identify the product category instead of the first unpackaged item or the second unpackaged item when analyzing a given image including one or more of the first unpackaged item or the second unpackaged item.

2. The method of claim 1, wherein the computer vision model is hosted on a first kiosk operating as a point of sale terminal, wherein the computer vision model is localized to imaging conditions of an imaging system associated with the first kiosk from a general version of the computer vision model available to a second kiosk subject to different imaging conditions.

3. The method of claim 1, further comprising, in response to removing an existing item from a product catalog:
  removing the existing item from a confusion matrix of the computer vision model; and
  updating product categories that included the existing item to no longer identify the existing item.

4. The method of claim 1, further comprising:
  capturing a new image that includes a new unpackaged item;
  identifying, by the computer vision model, a new product category that the new unpackaged item belongs to; and
  presenting, to a user, the new product category for selection of an individual member of the product category.

5. The method of claim 4, further comprising, in response to receiving a member selection from the user that does not match any individual member of the new product category:
  updating a confusion matrix of the computer vision model; and
  saving the new image for retraining the computer vision model to include an actual identity of an item in the new image with the new product category.

6. The method of claim 1, further comprising:
  capturing a new image that includes a new unpackaged item;
  identifying, by the computer vision model, a new product category that the new unpackaged item belongs to;
  receiving a selection of a new identity for the new unpackaged item from a user; and
  in response to the new identity not being a member of the new product category:
    presenting, to a user, the new product category to confirm the selection of the new identity.

7. The method of claim 1, further comprising:
  capturing a new image that includes a new unpackaged item;
  identifying, by the computer vision model, a new product category that the new unpackaged item belongs to; and
  in response to members of the new product category falling within a similarity window:
    automatically selecting one member of the new product category without prompting a user for input to distinguish members of the new product category.

8. The method of claim 7, wherein the one member of the new product category that is automatically selected is based on a purchase history of the user indicating above a frequency threshold that the one member is a most frequently selected member of the new product category by the user.

9. The method of claim 7, wherein the similarity window is based on at least one of:
  a price range between the members of the new product category;
  a weight of the new unpackaged item; and
  a number of instances of the new unpackaged item.

10. The method of claim 9, further comprising:
  increasing the similarity window for when to automatically select the one member of the new product category in response to a demand for kiosks exceeding a demand threshold.

11. A method, comprising:
  identifying, by a computer vision model, a product category for an unpackaged item in an image, wherein the product category includes two or more unpackaged items that the computer vision model cross-identifies with one another above a confusion threshold;
  receiving a selection, external from the computer vision model, of one of the two or more unpackaged items from the product category; and
  performing a transaction using the selected one of the two or more unpackaged items from the product category.

12. The method of claim 11, wherein the selection is received from a human user, the method further comprising:
  presenting, to the human user the two or more unpackaged items of the product category to select between.

13. The method of claim 11, further comprising:
  capturing a new image that includes a new unpackaged item;
  identifying, by the computer vision model, a new product category that the new unpackaged item belongs to, wherein the new product category includes two or more unpackaged items that the computer vision model cross-identifies with one another above the confusion threshold;
  receiving a new selection, external from the computer vision model, of a different unpackaged item not included in the new product category;
  performing the transaction using the different unpackaged item instead of a member of the new product category; and
  saving the new image for retraining the computer vision model to include an actual identity of an item in the new image with the new product category.

14. The method of claim 11, further comprising:
  capturing a new image that includes a new unpackaged item;
  identifying, by the computer vision model, a new product category that the new unpackaged item belongs to;
  receiving a selection of a new identity for the new unpackaged item from a human user; and
  in response to the new identity not being a member of the new product category:
    presenting, to the human user, the new product category to confirm the selection of the new identity.

15. The method of claim 11, wherein the selection is received by the computer vision model without prompting a human user for input to distinguish between members of the product category when the members of a new product category fall within a similarity window.

16. The method of claim 15, wherein a member of the product category that is automatically selected is based on a purchase history of the human user indicating above a frequency threshold that the one member is a most frequently selected member of the product category by the human user.

17. The method of claim 15, further comprising:
  increasing the similarity window for when to automatically select a member of the product category in response to a demand for kiosks exceeding a demand threshold.

18. A device, comprising:
a processor; and
a memory storing instructions that when executed by the processor provide a computer vision model configured to perform operations comprising:
- identifying, using a computer vision model, at least one product category that includes at least a first unpackaged item and a second unpackaged item from a product catalog that the computer vision model distinguishes between one another below a given confidence threshold; and
- in response to receiving a deployed image that includes one or more of the first unpackaged item or the second unpackaged item, identifying the product category instead of the first unpackaged item or the second unpackaged item.

19. The device of claim 18, wherein the product catalog defines unpackaged items as items having two or more of:
- a variable appearance from other unpackaged items sharing a given identity;
- a variable price from the other unpackaged items sharing the given identity; and
- excluding an non-intrinsic identifying feature.

20. The device of claim 18, wherein the product catalog defines unpackaged items as fruits or vegetables identifiable between different instances of a given fruit or vegetable by intrinsic features of the fruits or vegetables that the computer vision model is trained to differentiate different fruits and vegetables based on.

* * * * *